April 1, 1952 W. D. HERSHBERGER 2,591,257

STABILIZATION OF FREQUENCY MODULATED OSCILLATORS

Filed Nov. 30, 1948 2 SHEETS—SHEET 1

INVENTOR
William D. Hershberger
BY
J. L. Whittaker
ATTORNEY

INVENTOR
William D. Hershberger
BY J. L. Whittaker
ATTORNEY

Patented Apr. 1, 1952 2,591,257

UNITED STATES PATENT OFFICE 2,591,257

STABILIZATION OF FREQUENCY-MODULATED OSCILLATORS

William D. Hershberger, Princeton, N. J., assignor to Radio Corporation of America, a corporation of Delaware Application November 30, 1948, Serial No. 62,626

16 Claims. (Cl. 332—19)

This invention relates to methods and systems for stabilization of the mean carrier frequency of oscillators, particularly microwave oscillators, which are frequency-modulated at audio, video or other sub-carrier frequencies for transmission of intelligence.

In general, stabilization of the frequency of an oscillator involves comparison of its frequency with a reference or set-point frequency and the application to the oscillator of a corrective signal varying as a function of the difference between the compared frequencies. The stabilization of an oscillator which is frequency-modulated gives rise to complications and compromises because the stabilizing action inherently resists changes in frequency of the oscillator including the desired changes necessary for transmission of intelligence and due to the modulation signal. Stabilizing systems which provide continuous or high-repetition rate of frequency sampling and rapid application of the corrective signal for rigid control of the oscillator frequency are highly degenerative and so greatly reduce the percentage of modulation: stabilizing systems using a low-repetition rate of frequency sampling or slow application of the corrective signal are less degenerative but are incapable of holding the mean carrier frequency within close tolerances.

In accordance with the present invention, the previous interdependence of rigidity of stabilization and degree of frequency modulation is eliminated by varying the set-point frequency in accordance and concurrently with application of the modulation signal to the oscillator. More specifically, the modulating signal is utilized to shift the set-point frequency to substantially the same extent that the oscillator frequency, in absence of stabilization, would be shifted by that signal. Thus the mean carrier frequency of the oscillator can be rigidly controlled despite modulation, and high percentage of modulation can be obtained despite the inherently degenerative characteristic of the stabilizing control.

In some forms of the invention in which the set-point frequency is equal to the algebraic sum of the resonant frequency of a standard and the pass-frequency of a selective network, the modulating signal concurrently with its application to the oscillator is utilized correspondingly to vary either the pass-frequency of the network or the resonant frequency of the standard. In the latter case, when the frequency standard is an absorption line of a molecular resonant gas, the set-point frequency may be varied in accordance with the modulation by utilizing the modulation signal to vary a field applied to the gas; more particularly, the modulating signal applied to the oscillator is also applied to vary the potential of a Stark electrode within the gas cell. The effects of Stark field electrodes, herein termed "Stark electrodes" are described in an article entitled "Resolution of a Rotational Line of the OCS Molecule and Its Stark Effect" by T. W. Dakin et al. in Physical Review, vol. 70, October 1946, page 560.

In other forms of the invention, in which the set-point frequency is equal to the resonant frequency of a standard, the modulating signal is used to vary the resonant frequency of the standard in concommitance with its application to the oscillator.

The invention further resides in methods and systems having the features of novelty and utility hereinafter described and claimed.

For a more detailed understanding of the invention and for illustration of various forms thereof, reference is made to the accompanying drawings, in which:

Figure 1 is a block diagram of a frequency-modulated oscillator system stabilized in accordance with the invention;

Figure 2 schematically illustrates an arrangement for varying the pass-frequency of a selective network included in Figure 1;

Figures 1, 2:
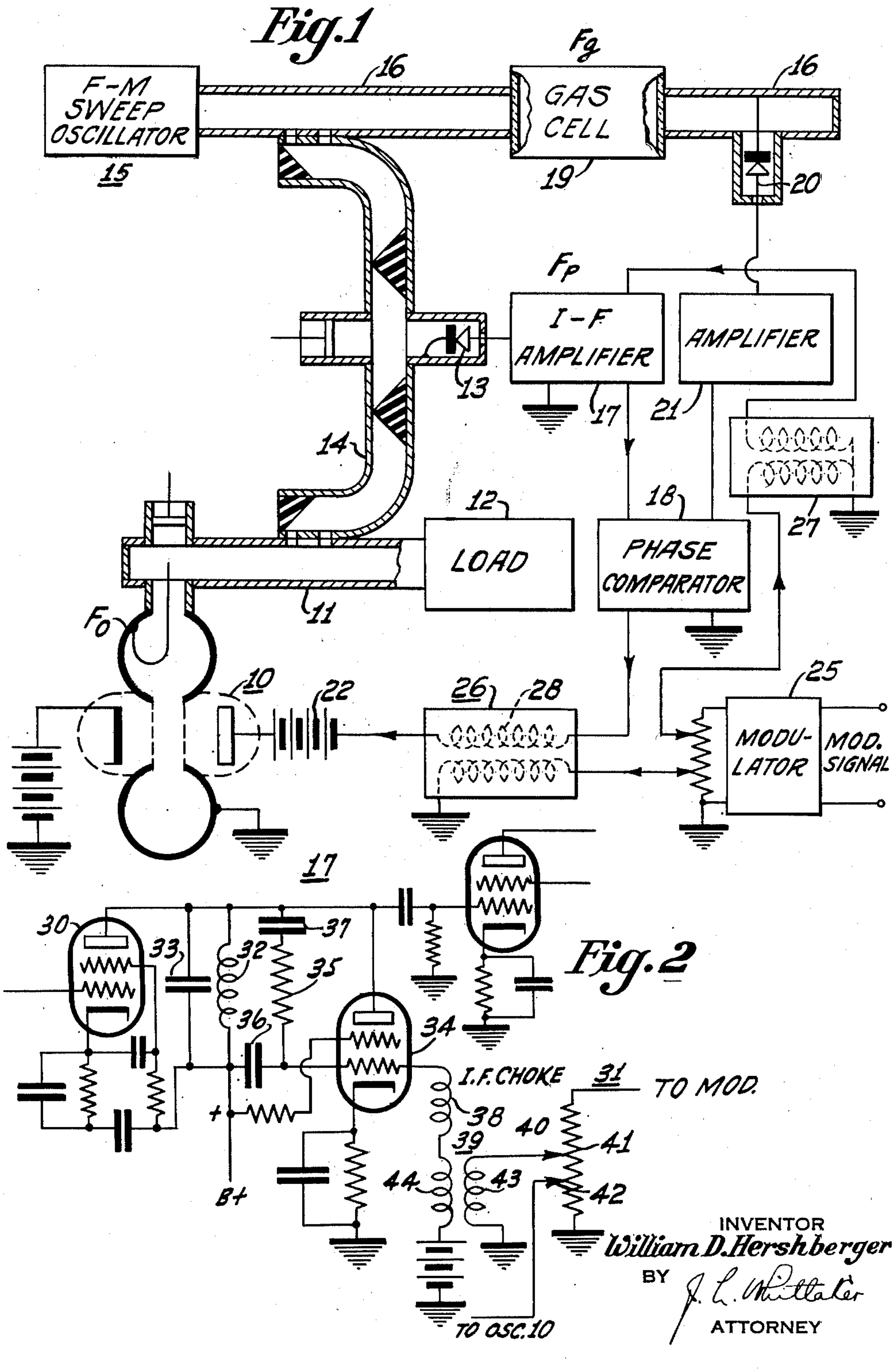

Referring to Figure 1, the reflex klystron 10 is generically illustrative of an oscillator which is to be frequency-modulated for transmission of intelligence and which is to be stabilized to maintain its mean carrier frequency within close tolerances. The output of the oscillator is impressed upon a transmission line 11, such as a wave guide or concentric line, for transmission to an antenna, an amplifier, or other load generically represented by the block 12. A portion of the output of oscillator 10 is impressed upon mixer 13, which may be a diode or a crystal rectifier, through a circuit including in the particular arrangement of Figure 1, a directional-coupler 14.

Another branch of directional-coupler 14 extends to transmission line 16, which also may be a wave guide or concentric line, extending from a sweep oscillator 15 which may be a klystron with an associated sawtooth oscillator for causing the frequency of oscillator 15 repeatedly to sweep over a range of frequencies including the resonant frequency of a standard 19 later herein mentioned.

The output of the mixer 13 includes a beat-frequency component equal to the difference between the frequencies of the oscillators 10 and 15; each time the varying beat-frequency passes through the value corresponding with that to which the intermediate frequency amplifier 17 is tuned, a pulse is transmitted to one input circuit of the phase-discriminator or coincidence-detector 18. Upon the other input circuit of phase-comparator 18 are impressed reference pulses produced each time the frequency of sweep oscillator 15 passes through the molecular resonant frequency of gas contained within the cell 19.

As more fully discussed in earlier of my co-pending applications including Serial No. 4,497, filed January 27, 1948, the microwave absorption spectra of ammonia, carbonyl sulphide, methyl halides and other gases having a dipole moment comprise "lines" of distinctive and different frequency distribution for each gas. At low pressures, in the case of ammonia for example, each of these "lines" breaks up into a plurality of fine, sharply defined lines, each precisely corresponding with a definite frequency.

Reverting to Figure 1, the output of the gas cell 19 as demodulated by rectifier 20 is a series of pulses, each amplified in amplifier 21 and occurring in time as the oscillator 15 sweeps through the gas-line frequency. Also in each cycle of the repetition rate of oscillator 15, the output of the intermediate frequency amplifier 17 includes a pulse occurring in time as the beat-frequency of oscillators 10 and 15 sweeps through the pass-frequency of amplifier 17. When the carrier frequency of oscillator 10 is equal to the set-point frequency, i. e., to the sum, or difference, as desired, of the molecular resonant frequency of cell 19 and the pass-frequency of amplifier 17, the unidirectional output of the phase-comparator 18 is of zero or other preselected value, and no corrective signal is applied to oscillator 10. When, however, the frequency of oscillator 10 shifts above or below the set-point frequency, the unidirectional output voltage of phase-comparator 18 changes in like sense and to corresponding extent to restore the oscillator frequency to the desired value.

As thus far described, the system is similar to that disclosed in my aforesaid application Serial No. 4,497, which, incidentally, shows one suitable type of phase-comparator. To vary the carrier frequency of the oscillator 10 for transmission of intelligence, the audio, video or other modulating signal may, in accordance with known practice, be applied to any of various electrodes of oscillator 10. In the particular arrangement shown in Figure 1, all or a desired fraction of the output of modulator 25 may be impressed as by transformer 26 upon the reflex-anode of tube 10. The secondary winding 28 of the modulating transformer 26 may be, as shown, in series with the source 22, which provides the direct-current operating potential of the reflex-anode, and with the source of frequency-corrective signal, i. e., the output circuit of phase-comparator 18.

For reasons well known to those skilled in the art, the application of a modulating signal to the klystron causes its frequency to vary so that a receiver suited for slope-detection or provided with a discriminator may extract the intelligence from the frequency-modulated carrier. However, the variations in oscillator frequency due to the modulating signal shift the timing of the two trains of pulses derived as above described, and the control signal produced by the phase-comparator tends to restore the carrier frequency to its original value in opposition to the effect of the modulation. The feed-back loop for maintaining frequency stability is incapable of distinguishing between undesired frequency changes due to variation in ambient or operating conditions, such as supply voltages, temperature and the like and intentional, desired frequency changes corresponding with modulation intelligence. This degenerative effect of the frequency-control system upon the modulation is overcome in the system of Figure 1 by changing the pass-frequency of amplifier 17 as a function of the modulating signal.

More specifically, the output of the modulator 25 is simultaneously impressed upon transducers 26, 27 whose output circuits are respectively connected to the oscillator 10 and to the intermediate amplifier 17. The change in pass-frequency of amplifier 17 due to the modulating signal is made to be substantially equal to the change in frequency of oscillator 10 effected by the same signal, and accordingly there is no change with modulation in the phasing of the trains of pulses applied to the input circuits of phase-comparator 18. Consequently, there is maintained a rigid tracking relation between the set-point frequency and the oscillator frequency with the result the mean carrier frequency of oscillator 10 is maintained constant.

As a specific example of one suitable arrangement for shifting the pass-frequency of the intermediate amplifier 17, reference is made to Figure 2 which shows two tubes 30, 31 of the amplifier and an intervening frequency-selective circuit comprising inductance 32 and capacitor 33. The anode of a reactance tube 34 is connected to one terminal of the tuned circuit and the control grid of the same tube is connected to a phasing network so proportioned that the intermediate-frequency signals supplied to the anode and grid are normally in 90° phase relation. Specifically, the phase-shifting network comprises a resistor 35 and a capacitor 36, the latter at the intermediate frequency having a reactance substantially equal to the resistance of resistor 35. The condenser 37 in series with resistor 35 between the control grid of tube 34 and the anode of tube 30 serves as a blocking condenser to prevent the direct-current anode voltage from being impressed upon the control grid of the reactance tube. The control grid of the reactance tube is connected through a choke 38 of high reactance at the intermediate frequency to a coupling device or network in the modulation signal circuit. Specifically, the grid circuit of tube 34 includes the secondary winding of transformer 39 whose primary winding 43 is connected to the adjustable contact 40 of a potential-divider in the output of modulator 25.

Thus, as a modulation signal is applied to the oscillator 10 to shift its frequency, the potential of the control grid of the reactance tube 34 is varied in accordance with the modulation to change the reactance of tube 34 as seen by the tuned circuit 32, 33. Accordingly, the pass-frequency of the intermediate amplifier 17 is automatically varied in accordance with the modulation correspondingly to vary the set-point frequency of the stabilizing system. The circuit constants are so selected or adjusted that the extent to which the pass-frequency of amplifier 17 is changed corresponds with the extent to which the oscillator frequency would be changed by the modulation signal in the absence of the stabilizing action of the frequency-controlling system. Accordingly, as more fully explained in discussion of Figure 5, the mean-carrier frequency of the oscillator is rigidly controlled despite the frequency modulation, and conversely the percentage of frequency modulation is not affected by the stabilizing action.

Figures 3, 4, 5:
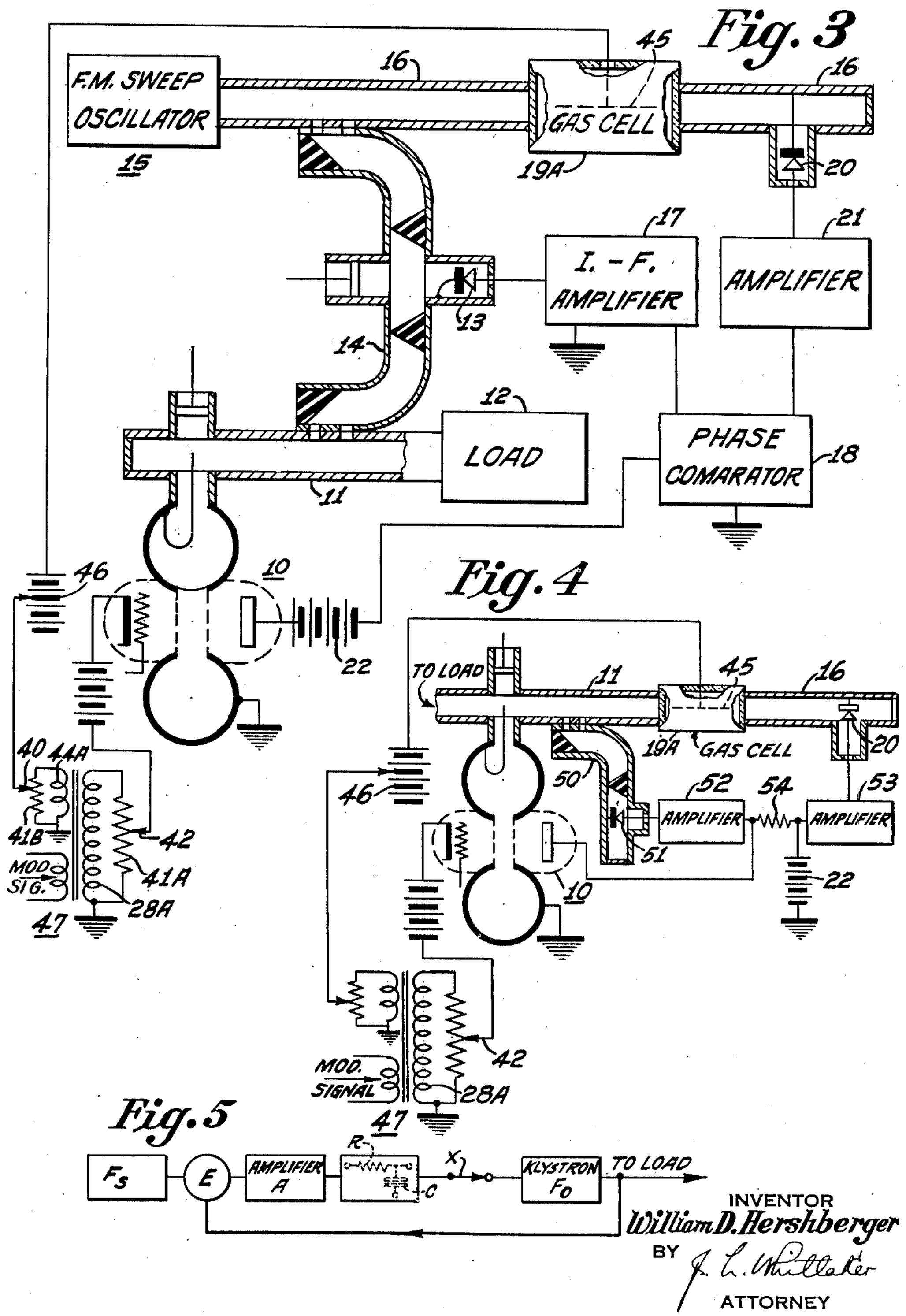
Figures 3 and 4 are modifications of the systems shown in Figure 1.
Figure 5 is an explanatory figure referred to in summary of principles involved in the operation of Figures 1, 3 and 4.

The modification shown in Figure 3 is generally similar to that of Figure 1 in that the frequency of the oscillator 10 is automatically controlled to maintain a predetermined phase relation between two series of pulses, the pulses of one series each occurring as the beat-frequency of the stabilized oscillator 10 and the sweep oscillator 15 passes through a predetermined value, and the pulses of the other series each occurring as the frequency of the sweep oscillator 15 passes through the molecular resonant frequency of gas cell 19A. In this modification, the set-point frequency of the stabilizing system is varied by changing the molecular resonant frequency of gas cell 19A in accordance with the modulation. Specifically, there is disposed within the gas cell a Stark electrode 45 to which a potential varying with the modulation is applied. In this connection it is noted, by way of example, that for the (3, 3) line of ammonia which corresponds with a frequency of 23,870.1 megacycles the molecular resonant frequency is increased by about 12 megacycles for a Stark electrode potential of about 1,000 volts per centimeter. Accordingly, by varying the potential of the Stark electrode in accordance with the modulation, the set-point frequency may be made to track the changes in carrier frequency of the oscillator, the frequency difference remaining constant so long as the mean carrier frequency is of the desired value. Any deviation from the desired value changes the phase relation of the pulses to the phase-comparator 18, and the potential of the reflex-anode of the oscillator 10 is varied in proper sense to compensate for the deviation. The control effective for a given deviation from the mean carrier frequency is the same whether or not a modulating signal is being applied.

In the particular arrangement shown in Figure 3, the secondary windings 28A and 44A of a modulating transformer 47 are respectively included in circuit with the oscillator and with the Stark electrode 45 of the frequency standard 19A. As a convenient means for obtaining the proper correlation between the changes in potential of the Stark electrode and the cathode of oscillator 10, the transformer windings 28A and 44A may be respectively shunted by potential dividers 41A, 41B whose contacts 42 and 40 are adjustable. To provide for selection of different mean carrier frequencies over a substantial range, an adjustable source 46 of stabilized direct-current voltage may be included in the Stark electrode circuit.

In the modification shown in Figure 4, which is generally similar to one described and claimed in my copending application, Serial No. 786,736, filed November 18, 1947, the frequency of the oscillator is compared with the molecular resonant frequency of a gas by comparing the outputs of two demodulators or rectifiers 20, 51 disposed respectively beyond and in advance of the gas cell 19A. As more fully explained in my aforesaid application Serial No. 786,736, when the two frequencies correspond, the joint output of the two demodulators is zero and no frequency-control effect is applied to the oscillator. When, however, the oscillator frequency is higher or lower than the molecular resonant freqeuncy of the gas, the resistor 54 is traversed by the unbalanced amplified output of the demodulators to increase or decrease the anode voltage of tube 10 with respect to the normal value of the direct-current supply source exemplified by battery 22.

More specifically, the rectifier 51 is connected by the directional-coupler 50 to the transmission line 11 in advance of gas cell 19A, and the amplified output of demodulator 51 is poled to oppose the output of amplifier 53 connected to demodulator 20 responsive to the oscillator energy transmitted through the gas cell 19A.

As thus far described, the application of a modulating signal to the oscillator 10 would tend to cause the oscillator frequency to vary, and the output of the stabilizing feed-back loop including demodulators 20, 51, amplifiers 52, 53 and resistor 54 would tend greatly to reduce the frequency change and so impair utility of the system for transmission of intelligence.

High percentage of modulation and rigid control of frequency may be obtained with the system by providing the gas cell 19A, Figure 4, with a Stark electrode whose potential is varied in accordance with the modulation so to change the molecular resonant frequency of the gas to the same extent that the frequency of oscillator would be changed by the modulating signal in the absence of any stabilizing control action. By way of example, if the modulation signal is one which in the absence of stabilization would cause the frequency of oscillator 10 to change by 6 megacycles (mc.), the potential of the Stark electrode 45 must be changed 500 volts per centimeter, assuming the 3, 3 line of ammonia is being used for stabilization to maintain proper tracking. One of many various arrangements for effecting simultaneous application of modulation to the oscillator and to the Stark electrode is shown in Figure 4. As this arrangement is similar to that discussed in connection with Figure 3, further discussion thereof appears unnecessary.

As will be more clear from the following discussion of the dynamic charactertics of the system, the frequency modulation capability of the systems of Figures 1, 3 and 4 and others employing the method of this invention, is independent of the modulating frequency and of the transfer characteristic of the stabilizing system. In fact, the theory which in another connection has already been developed for the treatment of feed-back amplifiers and of servo mechanisms is immediately applicable in the present instance.

Referring to Figure 5, the frequency $F_0$ of the oscillator to be stabilized is compared with the set-point frequency $F_S$ in an error-detector-discriminator designated E. From this error-detector we have an output voltage which is proportional to the difference between $F_0$ and $F_S$. This is $$V_1 = K_1 e$$

where $e = F_S - F_0$ is the error frequency and $K_1$ is the error detector or discriminator sensitivity in volts per mc. Thus the error detector is characterized first by its sensitivity and second by its ability to define a cross-over point for which the error $e$ and the voltage $V_1$ change sign.

The corresponding output voltage $V_2$ of amplifier A may accordingly be expressed as $$V_2 = K_2 V_1$$

where $K_2$ is the amplifier gain.

The resulting output voltage $V_3$ of time-constant network R, C, generically representative of phase-shift elements of the stabilizing system may be expressed as $$V_3 = K_3 V_2$$

where $$K_3 = \frac{1}{1 + j\omega RC}$$

is the transfer characteristic and $$\omega = 2\pi f$$

The operating frequency $F_0$ of the oscillator may be expressed as $$F_0 = K_4 V_3$$

where $K_4$ is the sensitivity of the klystron in mc./volts.

Consequently, the stabilized operating frequency $$F_0 = \frac{K_1 K_2 K_4}{1 + j\omega CR} \cdot (e)$$

$$= \mu (F_S - F_0)$$

where $$\mu = \frac{K_1 K_2 K_4}{1 + j\omega CR} \text{ (overall gain)}$$

$$= \frac{\mu}{\mu + 1} F_S$$

Now assuming a small change $\Delta F_S$ in set-point frequency, the corresponding change $\Delta F_0$ in the oscillator frequency may be $$(1) \qquad \Delta F_0 = \frac{\mu}{\mu + 1} \Delta F_S$$

The fraction $$\frac{\mu}{\mu + 1}$$

is a measure of the ability of a servo-mechanism to cause changes in an input quantity of $\Delta F_S$ to be reproduced in an output quantity $\Delta F_0$.

On the other hand, let us assume that we introduce a change in the reflector voltage of the klystron such as would give rise to a frequency change $\Delta F_0$ in an unstabilized klystron. In the system of Figure 5 when the frequency of the oscillator tries to change by the amount $\Delta F_0$, an error voltage $$\frac{\mu}{K_4} \Delta F_0$$

is developed, where $$\frac{\mu}{K_4}$$

is the gain of the system in volts per megacycle of difference frequency with the error voltage disconnected from the oscillator by switch X. However, when this voltage $$\frac{\mu}{K_4} \Delta F_0$$

is applied to the klystron, the frequency change is no longer $\Delta F_0$ but a residual frequency change $\Delta F_0'$ given by $$\Delta F_0' = \Delta F_0 - \mu \Delta F_0'$$

or $$(2) \qquad \Delta F_0' = \frac{1}{1 + \mu} \Delta F_0$$

The fraction $$\frac{1}{1 + \mu}$$

is a measure of the merit of the system in minimizing frequency deviations which rise from disturbance introduced in the klystron, such as changes in supply voltage, deformations in cavity size due to aging or temperature changes and changes in load impedance.

With the feedback loop closed and modulation applied both to change the oscillator frequency and the set-point frequency, the resulting change in oscillator frequency is the sum of Equations 1 and 2 supra and may be expressed as $$(3) \qquad \Delta F_0 + \Delta F_0' = \frac{\mu}{\mu + 1} \Delta F_S + \frac{1}{1 + \mu} \Delta F_0$$

Now imposing the condition of tracking, i. e. that the change in set-point frequency is equal to the change in oscillator frequency producible with the feed back loop open ($\Delta F_S = \Delta F_0$), Equation 3 becomes $$(4) \qquad \Delta F_0 + \Delta F_0' = \Delta F_S = \Delta F_0$$

In short, the frequency modulation is the same as though the oscillator was not subjected to rigid control of its mean carrier frequency.

From this analysis, it should be apparent to those skilled in the art that the invention is not limited to the particular systems specifically discussed and that changes and modifications may be made within the scope of the appended claims.

What is claimed is:

1. A stabilized, frequency-modulated oscillator system comprising an oscillator, means providing a set-point frequency, a closed feedback loop for applying to said oscillator a frequency-correction signal varying as a function of the difference between the set-point frequency and the oscillator frequency, modulating means for applying a modulating signal to said oscillator to vary its frequency and means responsive to said modulating signal for concurrently shifting the set-point frequency of said oscillator to extent substantially corresponding with the change in oscillator frequency producible by said modulating signal with said feedback loop open.

2. A system for stabilizing a frequency-modulated oscillator comprising means for providing a set-point frequency, a closed feedback loop for applying to said oscillator a frequency-correction signal varying as a function of the difference between the set-point frequency and the oscillator frequency, and tuning means for shifting the set-point frequency concurrently with modulation applied to the oscillator and to extent substantially corresponding with the change in oscillator frequency producible by the modulation with said feedback loop open.

3. A system for stabilizing a frequency-modulated microwave oscillator comprising means for providing a set-point frequency and including a cell containing gas exhibiting molecular resonance, a closed feedback loop for applying to said oscillator a frequency-correction signal varying as a function of the difference between the set-point frequency and the oscillator frequency, and means for shifting the set-point frequency concurrently with modulation applied to the oscillator and to extent substantially corresponding with the change in oscillator frequency producible by the modulation with said feedback loop open.

4. A system for stabilizing a frequency-modulated oscillator comprising means for providing a set-point frequency and including as components a frequency-standard and a beat-frequency amplifier, frequency-comparing means including a search oscillator for repeatedly scanning a range of frequencies including the standard frequency, a closed feedback loop for applying to said first-named oscillator a frequency-correction signal varying as a function of the difference between the set-point frequency and the frequency of the first-named oscillator, and means for applying the modulation signal to one of said components concurrently with its application to said first-named oscillator to shift the set-point frequency to extent substantially corresponding with the change in oscillator frequency producible by said modulation signal with said feedback loop open.

5. A system for stabilizing a frequency-modulated oscillator comprising means for providing a set-point frequency including a beat-frequency amplifier and a frequency-standard, frequency-comparing means including a search oscillator for repeatedly sweeping a range including the standard frequency, a feedback loop for applying to said first-named oscillator a frequency-correction signal varying as a function of the difference between the set-point frequency and the frequency of the first-named oscillator, and means for varying the beat-frequency selected by said amplifier in accordance with modulation applied to said oscillator to change its frequency.

6. A system for stabilizing a frequency-modulated oscillator comprising means for providing a set-point frequency including a beat-frequency amplifier and a frequency-standard, frequency-comparing means including a search oscillator for repeatedly sweeping a range including the standard frequency, a feedback loop for applying to said first-named oscillator a frequency-correction signal varying as a function of the difference between the set-point frequency and the frequency of the first-named oscillator, and means for varying the frequency of said standard in accordance with modulation applied to said oscillator to change its frequency.

7. A system for stabilizing a frequency-modulated oscillator comprising a cell containing molecular resonant gas for providing a set-point frequency, a closed feedback loop for applying to said oscillator a frequency-correction signal varying in dependence upon the difference between the set-point frequency and the oscillator frequency, a Stark field producing electrode within said cell, and means for applying a modulation signal concurrently to said oscillator and to said Stark electrode to shift the set-point frequency to extent substantially corresponding with the change of oscillator frequency producible by said modulation signal with said feedback loop open.

8. A system for stabilizing a frequency-modulated oscillator comprising a cell containing molecular resonant gas for producing a set-point frequency and upon which is impressed output energy of said oscillator, a closed feedback loop for applying to said oscillator a frequency-correction signal varying in dependence upon the difference between the set-point frequency and the oscillator frequency, a Stark field producing electrode within said cell, and means for applying a modulation signal concurrently to said oscillator and to said Stark electrode to shift the set-point frequency to extent substantially corresponding with the change of oscillator frequency producible by said modulation signal with said feedback loop open.

9. A system including an oscillator, a frequency-standard, means for comparing the frequency of said oscillator with the frequency of said standard including a frequency-selective element, modulating means for varying the frequency of said oscillator for transmission of intelligence, and tuning means controlled by said modulating means to shift the frequency-selective characteristic of said element in accordance with the modulation to immunize said frequency-comparing means to variations of oscillator-frequency due to modulation.

10. A stabilizing system for a frequency-modulated oscillator comprising a frequency-standard, means including a frequency-selective element responsive to deviations of the oscillator frequency with respect to the standard frequency, and tuning means for shifting the frequency-selective characteristic of said element in accordance with the modulation effectively to desensitize said responsive means to deviations of the oscillator frequency due to modulation.

11. A stabilizing system for a frequency-modulated oscillator comprising means including a frequency-selective network for producing an error voltage upon deviation of the frequency of said oscillator from a standard frequency, means for applying modulation to said oscillator to shift its instantaneous frequency and tuning means for concurrently varying the frequency selected by said network substantially to eliminate effect of the modulation upon said error voltage.

12. A method of stabilizing the frequency of a frequency-modulated oscillator which comprises comparing the oscillator frequency with a set-point frequency, applying to the oscillator a frequency-corrective signal varying in sense and magnitude with the difference of the compared frequencies, applying a modulation signal to said oscillator, and shifting the set-point frequency to extent substantially corresponding with the change in oscillator frequency otherwise producible by said modulation signal in absence of said frequency-corrective signal.

13. A method of utilizing a microwave selectively absorptive gas and a selective network for stabilizing the frequency of a frequency-modulated oscillator which comprises comparing the oscillator frequency with a set-point frequency equal to the algebraic sum of the molecular resonant frequency of said gas and the pass-frequency of said selective network, deriving a frequency-corrective signal varying in dependence upon the difference between the oscillator frequency and the set-point frequency, applying said frequency-corrective signal to said oscillator, and concurrently applying a modulating signal to said oscillator and shifting the set-point frequency to extent substantially corresponding with the change in oscillator frequency otherwise producible by said modulation signal in absence of said frequency-corrective signal.

14. A method of utilizing a microwave selectively absorptive gas and a selective network for stabilizing the frequency of a frequency-modulated oscillator which comprises comparing the oscillator frequency with a set-point frequency equal to the algebraic sum of the molecular resonant frequency of said gas and the pass-frequency of said selective network, deriving a frequency-corrective signal varying in dependence upon the difference between the oscillator frequency and the set-point frequency, applying said frequency-corrective signal to said oscillator, and concurrently applying a modulating signal to said oscillator and shifting said pass-frequency to extent substantially corresponding with the change in oscillator frequency otherwise producible by the modulation signal in absence of said frequency-corrective signal.

15. A method of utilizing a microwave selectively absorptive gas and a selective network for stabilizing the frequency of a frequency-modulated oscillator which comprises comparing the oscillator frequency with a set-point frequency equal to the algebraic sum of the molecular resonant frequency of said gas and the pass-frequency of said selective network, deriving a frequency-corrective signal varying in dependence upon the difference between the oscillator frequency and the set-point frequency, applying said frequency-corrective signal to said oscillator, applying an electric field to said gas, and modulating said electric field concurrently with modulation of the oscillator to shift said set-point frequency to extent substantially corresponding with the change in oscillator frequency otherwise producible by the modulation in absence of said frequency-corrective signal.

16. The method of utilizing a microwave selectively absorptive gas, a frequency-selective network, and a sweep oscillator for stabilizing the mean carrier frequency of a frequency-modulated oscillator which comprises impressing the output of said sweep oscillator upon said gas exhibiting molecular resonance, demodulating the energy transmitted by said gas to produce a series of pulses each occurring as the sweep-oscillator frequency passes through the molecular resonance frequency of said gas, mixing the output of said oscillators to produce a beat-frequency, impressing said beat-frequency upon said frequency-selective network, varying the frequency passed by said network in accordance with the modulation shift of said carrier frequency, producing a second series of pulses each occurring as said varying beat-frequency is passed by said network, and controlling said oscillator to minimize departure from a preselected phase relation of said series of pulses.

WILLIAM D. HERSHBERGER.

REFERENCES CITED

The following references are of record in the file of this patent:

UNITED STATES PATENTS

| Number | Name | Date |
|---|---|---|
| 2,279,659 | Crosby | Apr. 14, 1942 |
| 2,400,648 | Korman | May 21, 1946 |
| 2,462,294 | Thompson | Feb. 22, 1949 |
| 2,462,841 | Bruck et al. | Mar. 1, 1949 |